United States Patent [19]

Rowlinson

[11] 4,213,351
[45] Jul. 22, 1980

[54] STEERING SHAFT AND FLANGE AND METHOD OF MAKING SAME

[76] Inventor: James S. Rowlinson, 346 Southcote Rd., Ancaster, Ontario, Canada, L9G 2W2

[21] Appl. No.: 802,928

[22] Filed: Jun. 2, 1977

[30] Foreign Application Priority Data

Mar. 21, 1977 [CA] Canada .................................. 274330

[51] Int. Cl.² ............................................. B62D 1/16
[52] U.S. Cl. ........................................ 74/492; 72/367; 72/377
[58] Field of Search ................. 72/318, 322, 342, 377, 72/367; 219/150 R, 152, 154; 74/552, 492

[56] References Cited

U.S. PATENT DOCUMENTS

| | | | |
|---|---|---|---|
| 359,136 | 3/1887 | Dalzell | 72/339 |
| 3,021,421 | 2/1962 | Orgill | 219/150 R |
| 3,548,676 | 12/1970 | Breitschwerdt | 74/552 |
| 3,659,476 | 5/1972 | Wilfert et al. | 74/552 X |

FOREIGN PATENT DOCUMENTS

| | | | |
|---|---|---|---|
| 673733 | 11/1963 | Canada | 219/150 R |
| 247602 | 2/1926 | United Kingdom | 219/150 R |

*Primary Examiner*—Samuel Scott
*Assistant Examiner*—Jerry Anderson
*Attorney, Agent, or Firm*—Beveridge, DeGrandi, Kline & Lunsford

[57] ABSTRACT

A one piece, integrated steering shaft and flange for vehicles and the method of making it is disclosed. One end of a solid or hollow linear shaft is heated and placed in a die. A series of blows to the heated end shapes the flange by an upset forging method.

1 Claim, 10 Drawing Figures

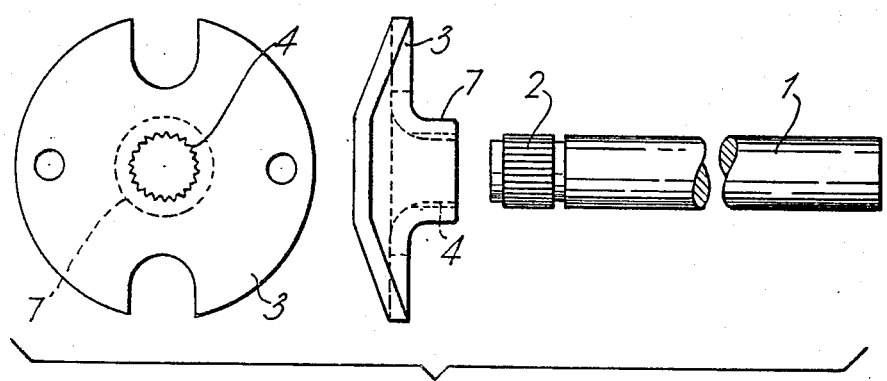
Fig-1- PRIOR ART
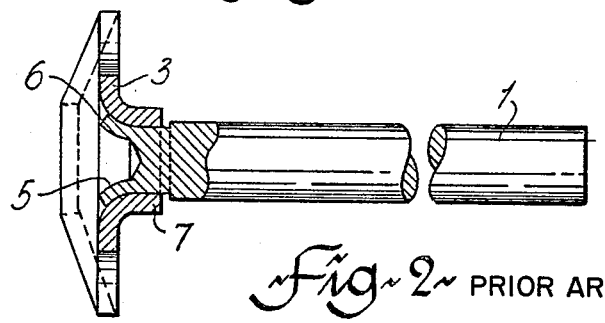
Fig-2- PRIOR ART
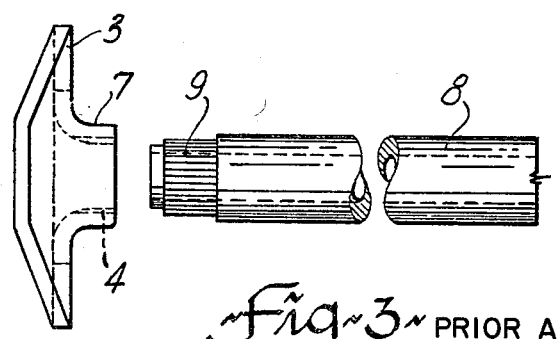
Fig-3- PRIOR ART
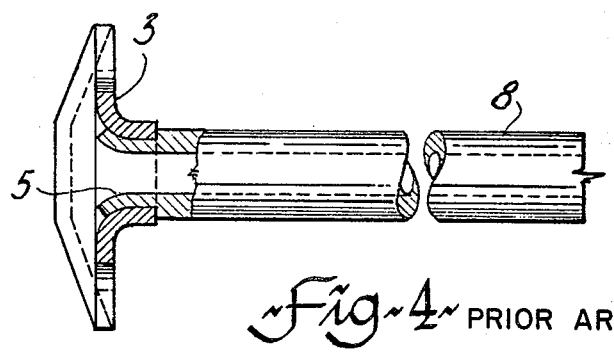
Fig-4- PRIOR ART

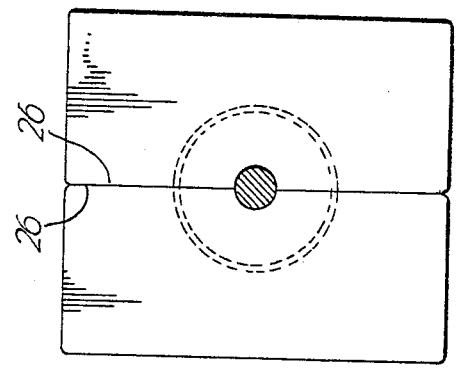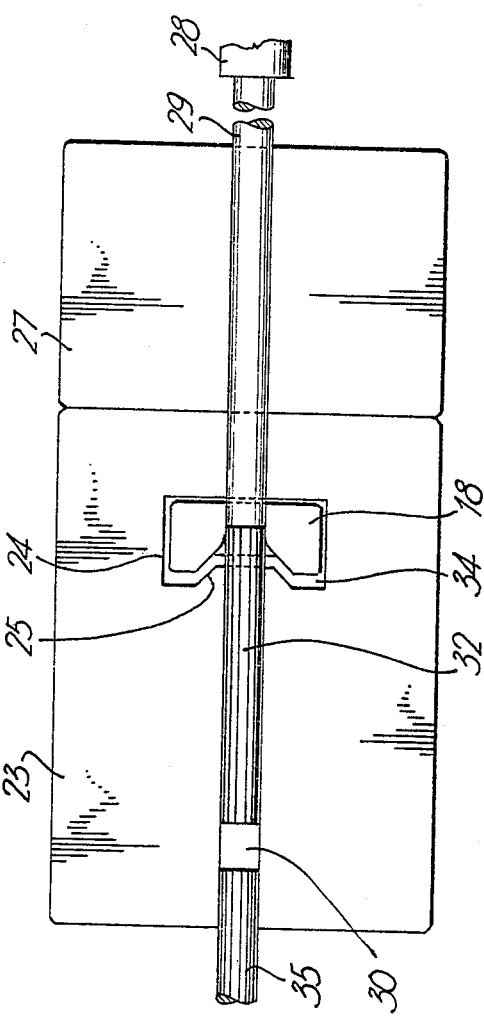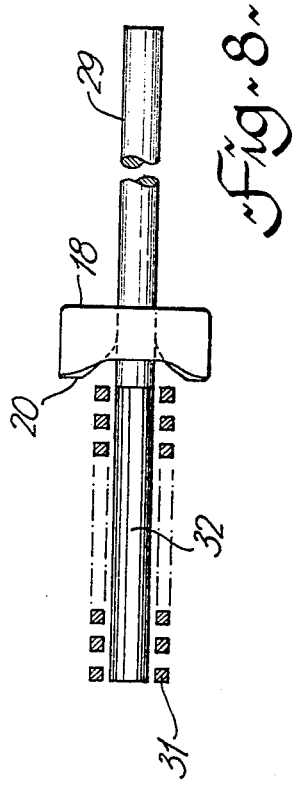

STEERING SHAFT AND FLANGE AND METHOD OF MAKING SAME

The present invention relates to an integrated steering shaft and flange and the method of making it. The apparatus is applicable for use in, but not limited to, automotive vehicles, military vehicles, snowmobiles and the like.

BACKGROUND OF THE INVENTION

Using automotive steering shafts and flanges as an example, the current method of manufacture consists of separate flanges and shafts manufactured as a subassembly. There are several disadvantages in the presently produced form of apparatus. Initially, as they are made from two pieces, an accident or some other form of abnormal loading such as severe terrain could cause separation of the two pieces resulting in loss of steering capability of the vehicle. Additionally, the torque strength is dependent upon the integrity of the joint of the two pieces and this joint is normally serrated. An abnormal shock load applied radially could shear the serrations causing the two parts to separate. An excessive axial loading can cause the two parts to become loose or even to separate longitudinally.

In the presently known construction, female serrations in the flange can be produced by means of broaching which is a reliable and consistent metal removal process. The serrations on the shaft are produced by the rolling process and are difficult to control to the required limits of accuracy that are necessary in order to obtain a totally reliable fit between the two parts. Additionally, the joint in the vicinity of the serrations is susceptible to deterioration from road salt and other corrosive substances which are used in large quantities in various parts of North America and particularly in Canada.

The two piece construction complicates quality control, scheduling of production, material procurement and parts control and is time consuming and costly to manufacture.

The weakness of the known two piece construction can contribute to serious malfunction or complete failure of a steering system of a vehicle. For example, if the joint between the two parts becomes loose, then backlash in the steering wheel is created which causes a lack of response when the steering wheel is rotated. Should the joint fail entirely and the two pieces become separated then the operator of the vehicle has no steering capability whatsoever.

SUMMARY OF THE INVENTION

In accordance with the present invention, the steering shaft and flange is made either from solid steel bar or from steel tubing and is integrally formed to provide a more reliable steering component which will contribute to vehicle operator safety. This component has greater strength than the currently used two piece arrangement and it has undiminished operating and functional characteristics and is capable of longer service life. The component according to the invention provides easier maintenance, repair or replacement and is compatible with practical manufacturing processes. There is a substantial simplification of production control and quality control procedures and it provides an advance in the state of the art of automotive parts design.

The one piece construction of the steering shaft and flange has considerable added strength over the two piece apparatus. Tensile, torque and impact characteristics show significant improvement and there is an improvement in the steering system of the vehicle. The incident of steering malfunction or loss of steering capability will be substantially reduced and the possibility of the shaft and flange being separated is eliminated.

From the manufacturing standpoint, only one section and grade of material is involved and this simplifies material procurement and control. Quality control procedures are also simplified due to the processing of one single component as opposed to the processing of two components which have to be joined together in a precise and exacting manner. The component will not deteriorate as quickly when exposed to road salt or other corrosive substances and therefore a longer service life can be expected.

According to one broad aspect, this invention relates to a one piece, integrated steering shaft and flange for vehicles, said flange being located at and upset on one end of said shaft.

According to a further aspect, this invention relates to a method of forming an integrated steering shaft and flange and utilizing a profiled ring and a die cavity having a matching profile therein; comprising the steps of (a) placing said profiled ring on a steel shaft; (b) heating a portion of said shaft to a point where it is upsetable; (c) placing the shaft and ring in a die with said ring accurately positioned in the die cavity; with the profiled face of the ring in juxtaposition to the profiled face in the die cavity; (d) closing said die; (e) applying pressure on the heated end of said shaft to flow it along a pilot section of the die and into the die cavity until the same is filled; (f) removing forming pressure from the shaft, and (g) removing the formed component from the die and removing the ring from the shaft.

BRIEF DESCRIPTION OF THE DRAWINGS

The invention is illustrated by way of example in the accompanying drawings in which:

FIG. 1 is an exploded view of a two piece steering shaft and flange where the shaft is of solid material;

FIG. 2 is a partially sectioned, assembled view of the apparatus in FIG. 1;

FIG. 3 is an exploded view of a two piece steering shaft and flange where the shaft is made from tubular material;

FIG. 4 is a view similar to FIG. 2 but showing the construction of a two piece shaft and flange where the shaft is made from tubular material;

FIGS. 7, 8 and 9 are views of the die arrangement and associated components used in the method of manufacturing the present invention.

DETAILED DESCRIPTION OF THE INVENTION

Figure 5A:
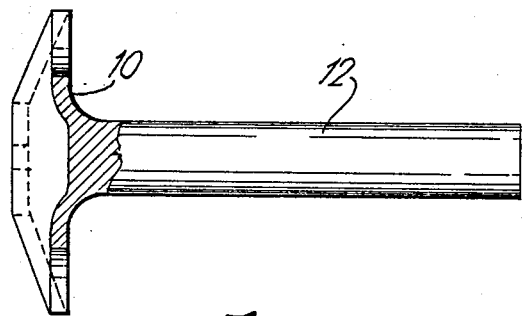
FIGS. 5a and 5b show side and end views of a one piece integrated shaft and flange according to the invention and wherein the shaft is solid.

FIGS. 1 through 4 inclusive disclose the prior art form of constructing a steering shaft with flange. Referring to FIG. 1, the component comprises a steering shaft 1 produced from 0.75 inch diameter SAE 1020 or SAE 1026 cold drawn round steel bar. A series of machine operations is performed on one end of the bar and including the forming of a number of male serrations 2 on the outside diameter at one end of the bar. The steering flange 3 is made from 0.180 inch thick hot rolled, low carbon, pickled and oiled steel. This flange is produced as a stamping with a protruding collar 7 into which a series of female serrations 4 are broached to match the serrations 2 on the end of the shaft 1.

The shaft 1 and flange 3 are assembled together as shown in FIG. 2 by joining the male serrations 2 to the female serrations 4 inside the protruding collar 7 of the flange. An operation is then carried out to deform or flare the extreme partially hollowed end of the shaft against the stamping as at 5 and, as a precaution against separation the shaft and flange are sometimes, but not always, welded together as at 6.

FIGS. 3 and 4 show a similar assembly to that in FIGS. 1 and 2 with the exception that the shaft material is tubular. This assembly is also manufactured as a sub-assembly comprising the two parts, the shaft 8 being produced from carbon steel seamless steel tubing and processed in a similar manner as the solid shaft in FIG. 1 to provide a series of male serrations 9 at one end of the shaft to mate with female serrations 4 on the interior of the collar 7 of the flange 3. The assembly of the tubular shaft 8 with the flange 3 follows the same procedures as that described above for the solid shaft and flange as indicated in the sectioned area of FIG. 4.

The disadvantages, deficiencies and weakness of the arrangements of FIGS. 1 through 4 have been described above.

Figure 5B:
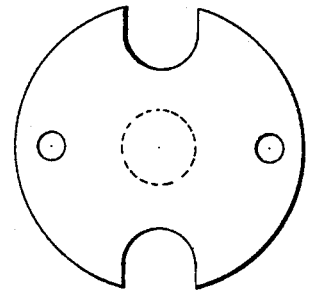

FIGS. 5a and 5b illustrate the integrated steering shaft and flange in accordance with the invention. This one piece construction comprises a shaft 12 made from 0.75 inch diameter SAE 1020 cold drawn round steel bar. The flange portion 10 is upset on one end of the bar to the basic geometric pattern required and maintains the essential dimensional characteristics. The upset part 10 is then further processed through a series of machining operations to complete the final specifications of the integrated component prior to its assembly in a vehicle. Accordingly, a steering shaft and flange is produced from one piece of material with numerous advantages.

Figure 6:
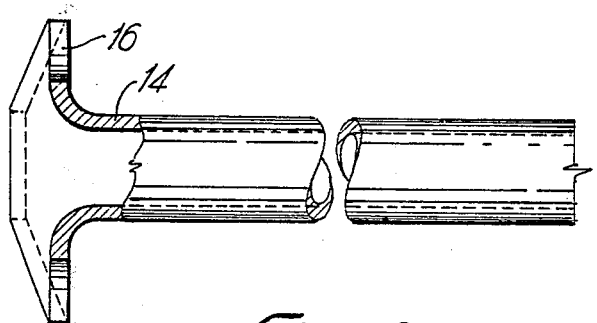
FIG. 6 is a partially sectioned view of an integrated shaft and flange where the shaft is formed of tubular construction.

In FIG. 6 the integrated shaft and flange is made from carbon steel seamless steel tubing in place of the solid steel bar shown in FIG. 5a. The flange 16 is upset on one end of the shaft tubing 14 to form an integral part of the unit and all of the essential geometry and dimensions are similar to that shown and described for the solid shaft and flange assembly of FIG. 5.

METHOD OF MANUFACTURE

Because of the complicated geometry of the flange portion 10 which includes a wave pattern as shown, it has been necessary not only to upset the flange but also to arrive at a method and means of extracting the part from the die after the upsetting operation.

When the flange 10 is to be upset on one end of a solid bar 12 as in FIG. 5, the material used is cold drawn SAE 1020 or SAE 1026 round steel bar of 0.75 inch diameter. The flange is formed achieving a maximum dimension of 3.25 inches with a thickness of 0.18 inch. Referring to FIGS. 7, 8 and 9, a ring 18 is produced with one face 20 formed to the required profile of one side of the flange 10 on the component.

A die 23 is provided and having a cavity 24 constructed in such a way that it has an opposite and matching profile 25 to that on the ring 18. In addition, the cavity 24 is capable of accepting and accurately locating the ring 18. The die 23 is split along adjoining faces as at 26 (FIG. 9) and has the capability of opening and closing.

A grip section 27 is secured adjacent to the die 23 and a fixed stop or locator 28 is also provided.

The die 23 also has a pilot or guide section 30 which controls the flow of the material at the actual upsetting operation. This pilot or guide section 30 is lubricated before the cycle of each upsetting operation with a fine graphite compound suspended in oil.

The ring 18 is placed on a steel bar 29 from which the component is to be produced. The steel bar 29 bearing the ring 18 is then placed in an electrical inductor 31 (FIG. 8) and heated to a temperature of 1,800°-2,000° Fahrenheit. The length of steel bar 29 which is heated will be equivalent in volume 32 to that of the flange which is to be upset on the end of the steel bar 29.

On reaching the required temperature the steel bar 29 together with the ring 18 is then placed in the opened die 23 with the ring 18 accurately positioned in the die cavity 24. The formed face 20 of the ring 18 and the formed face 25 in the die 23 automatically become adjacent to each other and form a female cavity 34 into which the heated steel bar 29 will be upset.

The end of the steel bar 29 opposite to the heated end 32 is positioned against a stop or locator 28 so that the heated portion 32 of the steel bar 29 is in correct relationship to the cavity 34.

The die 23 is then closed and locked so that the joint faces 26 seal against each other. The pilot or guide section 30 is created with sufficient clearance to compensate for the expansion of the heated portion 32 of the steel bar and to allow it to move freely to the right in FIG. 7.

The grip section 27 closes simultaneously with the die 23 but encloses an unheated portion of the steel bar 29 with a slight interference to hold and prevent it from moving longitudinally.

A horizontal hydraulically operated ram 35 is then actuated to move and exert pressure in the direction toward the cavity 34. This ram contacts the heated portion 32 of the steel bar and the material starts to move along the lubricated pilot or guide section 30, then begins to flow into the cavity 34 until the void is completely filled. Thus a flange to the desired shape and size is formed on the end of the steel bar 29 as an integral and completely whole unit.

The horizontal ram 35 then recedes away from the die cavity and the die 23, and simultaneously the grip section 27 reverts to the open position. The upset component together with the ring 18 are then removed and the ring is unloaded from the upset component to be used again.

Thus in one basic operation the desired shape and size has been achieved.

When the component has cooled to the ambient temperature, a series of machining operations prepare it for the assembly of its mating parts and its eventual inclusion in a motor vehicle.

With reference to the use of an elongated tubular member in place of the solid elongated member, the final form would be achieved in a similar manner to that described above. However in order to achieve the requisite volume of material, it has been found necessary to carry out a series of pre-forming operations prior to the final forming operation.

It has been found that the volume of material that is required to upset the flange is equal to approximately 6.6 times the diameter of the solid round steel bar from which the component is produced. This is achieved by piloting or guiding the material as it begins to flow into the die cavity. Accordingly, the material is under control at all times until the cavity is filled. In the present state of the art, it is general practice to upset a length of material which does not exceed twice or at most two and one-half times the diameter of the material being used.

It will be fully appreciated that the shape of the flange is such that it could not be formed in a conventional die process. The use of a separate and loose ring overcomes this restriction.

I claim:

1. A one piece, integrated steering shaft and flange for vehicles, said flange being located on the lower end of the steering shaft for connection to the steering mechanism of said vehicle, said flange being integrally formed on the end of said shaft by an upset forging process which includes the following steps:

(a) placing a ring which has a profiled face on a steel shaft;
   (b) heating a portion of said shaft to a point where it is upsettable;
   (c) placing the shaft and ring in the cavity of a die provided with a profiled face which matches the profiled face of the ring, said ring being positioned with its profiled face lying in juxtaposition to said profiled face of the die cavity;
   (d) closing said die;
   (e) applying axially compressive force on the heated end of said shaft to deform and flow it along a pilot section of the die and into the die cavity until the same is filled;
   (f) removing the compressive force from the shaft; and
   (g) removing the formed component from the die and removing the ring from the shaft.

* * * * *